United States Patent [19]

Gentile

[11] Patent Number: 5,076,591
[45] Date of Patent: Dec. 31, 1991

[54] GAS LEAKAGE SEAL

[75] Inventor: Richard W. Gentile, Schenectady, N.Y.

[73] Assignee: General Electric Company, Schenectady, N.Y.

[21] Appl. No.: 536,085

[22] Filed: Jun. 11, 1990

Related U.S. Application Data

[63] Continuation of Ser. No. 288,395, Dec. 22, 1988, abandoned.

[51] Int. Cl.$^5$ .................. F16J 15/08; F16J 15/10
[52] U.S. Cl. ........................ 277/70; 220/378; 277/180; 277/235 R; 277/236; 285/363; 285/910; 285/917; 415/113
[58] Field of Search ............ 277/71, 70, 1, 27, 235 R; 277/236; 285/368, 910, 418, 410; 220/378

[56] References Cited

U.S. PATENT DOCUMENTS

| | | | |
|---|---|---|---|
| 1,871,033 | 8/1932 | Bott | 277/182 X |
| 1,942,703 | 1/1934 | Hubbard et al. | 277/204 |
| 1,994,830 | 3/1935 | Nelson | 277/47 |
| 2,180,134 | 11/1939 | Baker et al. | 384/487 X |
| 2,185,339 | 1/1940 | Hickling | 277/47 X |
| 2,339,478 | 1/1944 | Haheisel | 277/180 |
| 2,513,178 | 6/1950 | Jackson | 277/180 X |
| 2,532,891 | 12/1950 | Chupp | 277/180 X |
| 2,620,242 | 12/1952 | Beatty, Jr. | 384/487 |
| 2,900,199 | 8/1959 | Logan | 277/188 R |
| 2,936,715 | 5/1960 | Southam et al. | 415/171.1 X |
| 3,618,989 | 11/1971 | Ito | 285/917 |
| 3,918,725 | 11/1975 | Dryer | 277/167.5 |
| 4,242,040 | 12/1980 | Swearingen | 415/113 |
| 4,336,943 | 6/1982 | Chaplin | 415/113 X |
| 4,361,335 | 11/1982 | Vinciguerra | 277/204 |

FOREIGN PATENT DOCUMENTS

| | | | |
|---|---|---|---|
| 199015 | 8/1958 | Austria | 285/95 |
| 2239314 | 2/1974 | Fed. Rep. of Germany | 285/363 |
| 230913 | 12/1985 | German Democratic Rep. | 277/167.5 |

*Primary Examiner*—Allan N. Shoap
*Attorney, Agent, or Firm*—Nixon & Vanderhye

[57] ABSTRACT

A combination air seal for opposed flanges of a casing structure containing air at elevated pressure includes rectangular cross-section groove in one face of one of the opposed flanges and a narrow compressible gasket or seal strip in the groove at one side thereof to define an open transverse channel in the groove oriented transversely to the direction of air leakage through the flanges from the elevated pressure conditions in the structure. Air under elevated pressure leaks across the interface of the flanges to be taken up by the open transverse channel and conducted to a lower pressure region of the structure for further utilization. The gasket is adapted to be adequately but not excessively compressed when metal to metal engagement of the flanges is achieved. The compressed gasket prevents excess air in the channel from escaping from the channel to pass across the flange interface and escape from the casing structure.

14 Claims, 1 Drawing Sheet

GAS LEAKAGE SEAL

This is a continuation of application Ser. No. 07/288,395, filed Dec. 22, 1988, now abandoned.

BACKGROUND OF THE INVENTION

This invention relates to improved gas seals, and more particularly to a dual gas seal structure and arrangement which provides for containment and utilization of gas leakage across two opposed flanges of a pressure vessel structure.

In some pressure vessel applications, a gasket or seal is employed together with a flange connection to prevent a gas such as air from escaping through flange joints. For various technical reasons, some flange joints are employed which are not capable of totally sealing an air leak and some quantity of escaping air is acceptable, particularly where the amount of escaping air does not deleteriously affect the overall system of which the air is a part.

Hot gas turbine generators ordinarily utilize an air compressor having a cylindrical casing enclosing a cylindrical bladed rotor therein. Air at atmospheric pressure is ducted into the compressor at one open end of the cylinder to be compressed by the rotating blades of the rotor interengaging with blades in the casing. Air at elevated pressure is taken from the opposite end of the casing to be directed to combustion and exhaust system regions of the gas turbine apparatus which operate at a lower pressure. The compressor casing as well as intermediate parts of the casing between the compressor and the combustion system usually comprise a multipart arrangement of component sections suitably bolted together with appropriate flanges. Unfortunately it has been found that excess air leakage may occur through the usual flat metal to metal engaging surface of the flanges of the multipart assembly, for example, because of thermal distortion of the flanges. Air leakage becomes an increasing problem where the casing structure includes curved and angled parts. It is difficult for the otherwise desirable machined surface flanges to maintain desired air sealing characteristics when the casing includes sections which are curved or at an angle to each other and the flanges are angled accordingly. For example, a flange may be utilized to seal to a horizontal as well as to a vertical surface and may utilize a single right angle flange to do so. The use of a gasket seal between the flanges is not only a deterrent to the more desirable metal to metal surface contact of the flanges, but also becomes a problem where the gasket seal might only be used where most air leakage occurs and therefore becomes an obstruction in the overall coextensive contact of the flange surfaces.

OBJECTS OF THE INVENTION

It is an object of this invention to provide an improved seal between engaging flanges associated with a hot gas turbine engine without preventing contact of mating machined surfaces of the flanges.

It is another object of this invention to provide an improved gas seal between mating flanges of a gas turbine casing by recessing an improved compressible seal structure in a gas channelling groove in one of the flanges.

It is a further object of this invention to provide an improved gas seal in mating flange surfaces of a gas turbine compressor casing by the combination of a recessed compressible seal in a groove in one of the flanges and a transverse air channel which conducts air leaking across the flange to a location in the gas turbine, where the air pressure is less than the leaking gas pressure, for further utilization thereof.

SUMMARY OF THE INVENTION

One of a pair of opposed machined flange surfaces of an air containment casing structure of a hot gas turbine generator includes a shallow groove therein. A compressible seal in the groove and at one side thereof is adapted to be adequately but not excessively compressed when the flange surfaces meet in metal to metal contact. The compressed resilient seal is retained at one side of the groove to define a narrow open air channel with the opposite side of the groove. Air leakage through the flange mating surfaces is captured by the open channel and conducted to a region of lower pressure of the gas turbine for efficient utilization thereof. The compressible seal prevents leakage air from escaping between the mating flanges as undesirable and potentially injurious hot air jets.

This invention will be better understood when taken in connection with the following description and drawings.

DESCRIPTION OF A PREFERRED EMBODIMENT OF THE INVENTION

Figure 1:
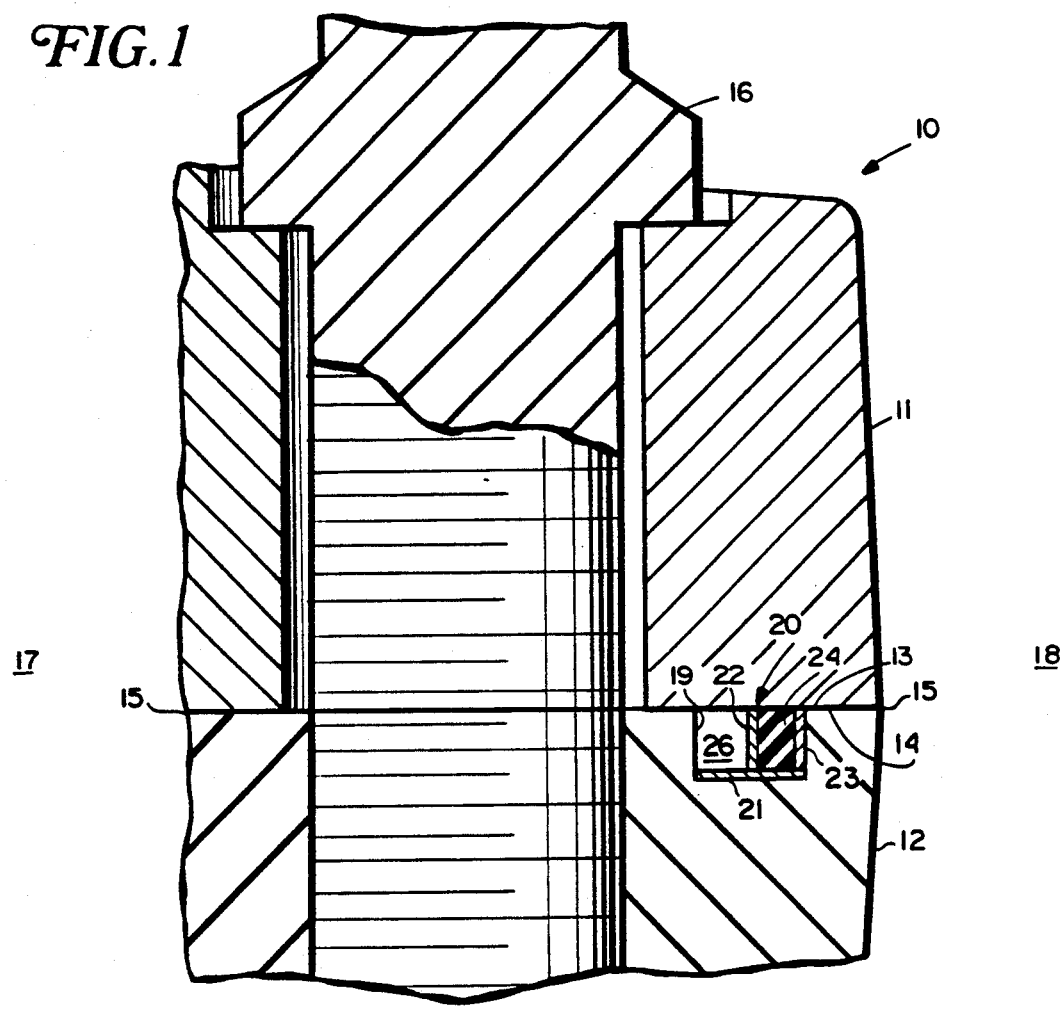
FIG. 1 is a partial and transverse cross-sectional illustration of a flange seal structure embodying the features of this invention.

Referring now to FIG. 1, the flange seal assembly 10 comprises an upper flange 11 and an opposed lower flange 12 having smooth machined surfaces 13 and 14, respectively, and retained in a metal to metal interface relationship 15 by means of a flange bolt 16 passing through flange 11 and threadedly engaging flange 12. Ordinarily flange 11 may be associated with an upper half casing section such as a horizontally split casing section of an axial flow compressor and flange 12 is associated with a lower half opposite casing section. A row of bolts (only one shown, 16) along the flanges retain the joined casing half in a structural relationship which may be part of an axial flow compressor or a turbine casing structure. In a usual practice, a row of spaced bolts 16 are employed along an upper flange 11 and threaded sufficiently into a lower flange 12 so that their smooth or machined surfaces 13 and 14 meet in a tight metal to metal interface 15, an arrangement which is usually sufficient to prevent excess air leakage from inside the structure, generally at 17 transversely along the interface 15 to escape from the structure to the environment generally at 18.

A flange such as flange 10 of FIG. 1 may be one of extended length and may include curves, turns and angles therealong. Flanges which include abrupt changes of direction and curves have been found to leak air particularly at the direction changes or curves while linear and straight sections seal adequately. The use of a flat gasket between flanges only at the leaking locations prevents the machined surfaces 13 and 14 from forming a continuous tight interface 15 because of the wedging action of such a gasket, and, where the casing may contain close fitting operating components or moving mechanisms, proper clearance between the mechanism and the casing may be difficult to maintain.

The seal structure of the present invention provides an effective continuous seal for flanges having curves and abrupt directional changes. Referring again to FIG. 1 one of the opposed flanges, flange 12 for example, includes a rectangular cross-section groove 19 therein which extends along the full length of the flange including curves, corners, and other directional changes. Groove 19 extends along flange 12 transversely with respect to the usual direction of air leakage from region 17 to environment 18 along interface 15. A gasket structure 20 which conforms to the shape of groove 19 is fitted into groove 19. Gasket structure 20 is best described in connection with FIG. 2.

Figure 2:
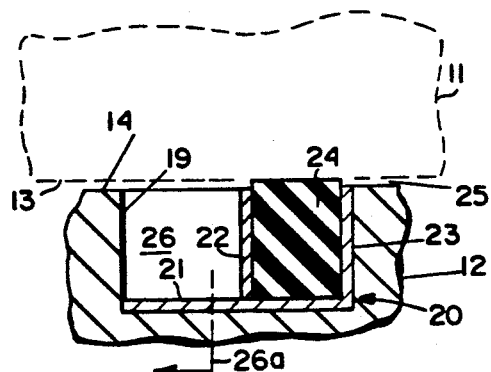
FIG. 2 is an enlarged and transverse cross-sectional illustration of an extended length gasket seal structure of FIG. 1.

Referring now to FIG. 2, gasket structure 20 includes a bottom strip 21 and a pair of upstanding spaced apart sidewall strips 22 and 23. Strips 21, 22 and 23 are preferably thin flexible metal strips such as stainless steel or hard bronze, each being of a long narrow rectangular configuration to conform smoothly with the long narrow rectangular walls of grooves 19. Spaced apart strips 22 and 23 fit within rectangular groove 19 so that they rest with a longitudinal edge on bottom strip 21. Strips 22 and 23 are joined to bottom strip 21 by welding or brazing for example (see FIG. 3) to provide an integral unitary structure whose overall height is equal to or slightly less than the depth of groove 19. Spaced apart strips 22 and 23 define sidewalls of a rectangular cross section space in which a rectangular cross section compressible flexible seal strip or gasket 24 is fitted. The overall height of gasket 24, when fitted between strips 22 and 23, is greater than the depth of groove 19 to bottom wall 21 by a value generally about equal to its degree of compressibility. The degree of compressibility of a gasket should ordinarily be fully attained in a gasket structure but not significantly exceeded. For example, if gasket 24 of FIG. 2 may be compressed a fixed amount in its height dimension before the material becomes quite solid and non-porous, then gasket 24 is dimensioned to reside in the FIGS. 1 and 2 relationship with a height which extends from machined surface 14 by its range or degree of compressibility 25 of FIG. 2. Since gasket structure 20 comprises thin flexible metal strips with a flexible gasket 24 therein, the unitary structure is quite flexible to be easily fitted to directional changes in groove 19 or otherwise preformed to do so. The depth of groove 19 for gasket 24 dimensioning purposes is the distance between interface line 15 to strip 21 of FIG. 1. Under sealing conditions gasket 24 is fully compressed when flanges 11 and 12 meet in a tightly engaging machined surface interface 15 of FIG. 1, and, when fully compressed, the material of gasket 24 lacks porosity and engages machined surface 13 in tight sealing relationship. Sidewall strip 22 becomes a partition in groove 19 to isolate the remaining width of groove 19 as an air channel 26 which is coextensive with sidewall 22 and gasket 24. Groove 19 and channel 26 are of predetermined dimensions for the apparatus of application, for example, a hot gas turbine engine so that channel 26 ultimately leads to or empties into a region of much lower pressure than the air leakage pressure. In a hot gas turbine apparatus, additional air is usually needed for cooling of components which operate at very high temperatures. Accordingly, by the present invention channel 26 may intercept air that formerly was lost through leakage and conduct the air to appropriate ducts leading to these low pressure regions for effective and further utilization. In a hot gas turbine, for example, the channel 26 may lead to a manifold (shown schematically at 26a in FIG. 2) from which air is supplied for various uses within the gas turbine apparatus or uses which are extraneous to the apparatus. After utilization within the apparatus, this air may be admitted into the combustion system or the hot gas stream of the apparatus.

In the operation of the seal of FIG. 1, air at high pressure from an interior casing region 17 may progress between flanges 11 and 12 and along interface 15 to the seal structure 20 of this invention. At this point a dual air leakage control takes place. The first part of the dual control involves the transverse channel 26 in which low air pressure conditions exist. Air at high pressure is caused to enter lower pressure channel 26 from interface 15 and follow the low pressure conditions in channel 26 to be ultimately directed to a low pressure region of the associated apparatus. Should channel 26 be fully involved in moving high pressure air to a lower pressure region, any excess air attempting to further proceed along interface 15 is prevented from doing so by the second part of the dual air control comprising the gasket 24 which is compressed between flanges 11 and 12 to close off any pores or passages therein which might permit the passage of excess air from the channel 26 therethrough. The seal structure of this invention as described is a combined air bleed off and gasket seal. The compressible gasket 24 may be chosen from various well known compressible gasket or seal materials including, for example rubbery and fibrous materials as well as fine metal wire mesh braids or roping. Alternatively a metal structure as shown in FIG. 3 may be employed.

Figure 3:
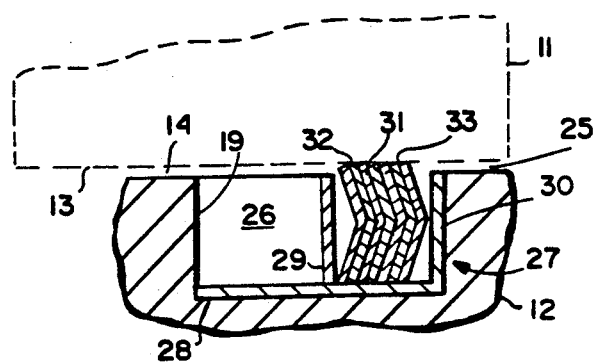
FIG. 3 is a modification of the seal structure of FIG. 2.

Referring now to FIG. 3 the chevron seal structure 27 is similar to seal structure 20 of FIGS. 1 and 2 and comprises, in a similar manner, bottom strip 28 and sidewall strips 29 and 30, all similar to strips 21, 22 and 23, respectively, of FIGS. 1 and 2. In the space between and enclosed by sidewall strips 29 and 30 a plurality of thin wall angle strips 31 are positioned with their longitudinal edges resting on bottom strip 28 and in laterally spaced apart parallel relationship. Each strip 31 is slightly folded or bent about its longitudinal axis so that the grid structure, in cross section, as illustrated in FIG. 3 defines a chevron-like structure with each angled strip or chevron 31 in spaced apart nesting relationship with an adjacent strip 31. Each chevron strip becomes a resilient or spring member which engages the surface of an opposing flange with continuous biasing action along a plurality of very narrow areas or edges in effective series transverse air sealing relationship. The height of chevron strips 31 is greater than the gasket depth of groove 19, as defined, to extend from surface 14 a distance related to its comparable compressibility range 25. (FIGS. 2 and 3) As flange 11 engages strips 31, strips 31 are caused to flex at their angled regions which reduces their height. When flanges 11 and 12 are fully engaged, each strip 31 will retain a high degree of resiliency or spring action to tightly engage flange surface 13. An excess compressibility range 25 may cause strips 31 to exceed their limit of elasticity and be permanently deformed or set so that when the flanges are fully engaged there is no stored resiliency in thin wall strips 31 to press tightly against flange 11. Increased resiliency and less deformation are achieved when a further strip or layer of a rubbery or fibrous material 33 is interlaved with or alternated with strips 31. Furthermore, thin wall strips 31 must be spaced sufficiently from sidewall 30 so that, in their flexing range, they do not prematurely contact sidewall 30 and be permanently deformed before the air seal is effective. The free edges of thin wall strips 31 which engage a smooth surface of an opposing flange define a generally planar surface 32 which meets an opposite flange surface 13 in planar abutting relationship, and when flanges 11 and 12 are fully engaged, thin wall strips 31 continue to press tightly against the opposing flange because of their stored resiliency structure. It is important that the compressibility range or dimension 25 not be excessive so as to cause the gasket material of FIG. 2 to extrude between the flange surfaces and prevent smooth metal to metal contact. Similarly the thin walls 31 of FIG. 3 should not be permanently deformed between the flanges. The sidewalls 22 and 23 of FIGS. 1 and 2 essentially fully contain gasket 24 so that the material itself absorbs the compression, and brazing of thin walls 31 to bottom wall 28 and side wall 30 maintains their structural integrity for controlled compressibility flexure. "Compressibility range" is defined differently but interrelated for various sealing materials and for a compressible rubbery-like gasket member is the reduction in height of a gasket enclosed on three sides as in FIG. 2 by a compressive force exerted thereon which will deform the material on itself to close off any signficant amount of porosity within the material. For the chevron seal of FIG. 3, the compressibility range relates to the extent to which the height of the chevron strips may be diminished or further angled by movement of the upper flange against the chevrons for increased sealing force of the chevron against the flange without permanent deformation of the chevrons but with residual resiliencey therein when the flanges meet. A layer of rubbery or fibrous material 33 is between each chevron layer. It is a feature of this invention that the opposed flanges meet in metal to metal engaging relationship to have the seal be compressed in its range of compressibility so that further forcing of flange engagement does not result in further compression of the seal. The distance a gasket 24 projects from a flange surface to define the space or distance 25 of FIGS. 2 and 3 so that when the flange surfaces meet in engagement as shown in FIG. 1, the gasket or seals are compressed to their most effective amount and not more so since additional compression may cause seal damage.

While this invention has been disclosed and described with respect to preferred embodiments thereof, it will be understood by those skilled in the art that various changes and modifications may be made without departing from the spirit and scope of the invention as set forth in the following claims.

What is claimed:

1. In an air containment multisection casing structure of a gas turbine generator, a gas leak control and seal device for insertion in an elongated groove provided in a flange of said multisection casing structure wherein the groove is defined by a bottom wall and a pair of sidewalls extending from the bottom wall, the device comprising:

an elongated strip including a bottom wall strip seated on said groove bottom wall, said bottom wall strip having first and second upstanding sidewalls extending substantially parallel to each other and substantially perpendicularly from said bottom wall strip to thereby define a sealing channel between said pair of upstanding sidewalls, and a gas control channel between one of said strip sidewalls and one of said groove sidewalls; and a compressible, flexible seal element located in said sealing channel between said pair of upstanding strip sidewalls.

2. The device according to claim 1 wherein said elongated strip is comprised of metal.

3. The device according to claim 1 wherein said seal element extends above upper edges of said pair of sidewalls.

4. The device according to claim 3 wherein said seal element extends above said upper edges of said side walls an amount corresponding substantially to a compressibility characteristic of said seal element.

5. The device according to claim 1 wherein said seal element is comprised of a rubbery material.

6. The device according to claim 1 wherein said seal element is comprised of a plurality of angle strips.

7. A gas leakage seal for a casing of a pressure vessel adapted to contain gas at an elevated pressure in one region of said casing and gas at a lower pressure in another region of said casing, wherein said casing is comprised of at least two sections, one of said sections having a first metal flange adapted to be engaged by a second, opposed metal flange in metal-to-metal sealing contact; said gas leakage seal comprising a groove formed in one of said first and second metal flanges and defined by a bottom wall and two substantially parallel side walls, said groove having predetermined depth and width dimensions, and extending in a direction substantially transverse to a normal direction of gas leakage between said first and second flanges, and an elongated gasket structure received within said groove and extending coextensively therewith; said gasket structure defining within said groove first and second channels located side-by-side, each channel extending coextensively with said groove, said first channel comprising a gas channel communicating with a lower pressure region of said casing, and serving to conduct leakage gas to said lower pressure region of said casing; a compressible sealing member disposed within said second channel and having a height greater than said depth dimension of said groove so that said sealing member is compressed within said second channel by said first and second flanges when said first and second flanges meet in metal-to-metal contact, said sealing member thereby preventing excess gas leakage from escaping between said first and second flanges, and wherein said elongated gasket structure includes a bottom wall strip having a width substantially equal to said width dimension of said groove and seated on said bottom wall of said groove, and a pair of substantially parallel side wall strips extending in upright spaced apart relationship, one of said side wall strips engaging one of said side walls of said groove and the other of said side wall strips forming a separator between said first and second side-by-side channels.

8. The invention as recited in claim 7 wherein said bottom wall strip and said pair of side wall strips are joined to provide a unitary, integral and flexible structure of extended length.

9. The invention as recited in claim 7 wherein said compressible sealing member is a non-metal sealing gasket.

10. The invention as recited in claim 7 wherein said compressible sealing member is metallic.

11. The invention as recited in claim 7 wherein said compressible sealing member is a chevron seal.

12. The invention as recited in claim 7 wherein said compressible sealing member extends outwardly from said groove a distance generally equal to its compressibility range before said flanges meet in metal to metal contact.

13. The invention as recited in claim 7 wherein said bottom wall strip and sidewall strips are stainless steel.

14. The invention as recited in claim 7 wherein said bottom wall strip and said pair of said wall strips are joined by brazing.

* * * * *